US012502802B2

(12) United States Patent
Shindo et al.

(10) Patent No.: US 12,502,802 B2
(45) Date of Patent: Dec. 23, 2025

(54) STAPLER

(71) Applicant: Max Co., Ltd., Tokyo (JP)

(72) Inventors: Takushi Shindo, Tokyo (JP); Futoshi Kameda, Tokyo (JP)

(73) Assignee: Max Co., Ltd., Tokyo (JP)

( * ) Notice: Subject to any disclaimer, the term of this patent is extended or adjusted under 35 U.S.C. 154(b) by 36 days.

(21) Appl. No.: 18/396,420

(22) Filed: Dec. 26, 2023

(65) Prior Publication Data

US 2024/0208102 A1 Jun. 27, 2024

(30) Foreign Application Priority Data

Dec. 26, 2022 (JP) ................................ 2022-207982

(51) Int. Cl.
*B27F 7/19* (2006.01)
*B27F 7/36* (2006.01)

(52) U.S. Cl.
CPC . *B27F 7/19* (2013.01); *B27F 7/36* (2013.01)

(58) Field of Classification Search
CPC .................................... B27F 7/19; B27F 7/36
USPC .......................................................... 227/155
See application file for complete search history.

(56) References Cited

U.S. PATENT DOCUMENTS 2,153,874 A 4/1939 Posnack
3,279,672 A 10/1966 Mckee
2003/0042286 A1* 3/2003 Yoshie ..................... B27F 7/19 227/119
2004/0169058 A1* 9/2004 Mochizuki ................ B27F 7/36 227/131
2004/0245307 A1* 12/2004 Haramiishi ............... B27F 7/38 227/4
2005/0077338 A1* 4/2005 Ishizaki .................... B27F 7/19 227/155
2007/0210136 A1* 9/2007 Sugihara ................... B27F 7/19 227/155
2009/0314819 A1 12/2009 Co
2013/0001269 A1* 1/2013 Aoki ..................... B25C 5/1617 227/155

FOREIGN PATENT DOCUMENTS

| | | | | |
|---|---|---|---|---|
| DE | 2005023 | A1 | 8/1970 | |
| EP | 1711314 | B1 | 6/2010 | |
| EP | 4393650 | A1 * | 7/2024 | ........... B25C 5/0221 |
| JP | H11-512659 | A | 11/1999 | |
| WO | 97-031758 | A1 | 9/1997 | |

OTHER PUBLICATIONS

May 24, 2024—(EP) Search Report—App 23219683.2.

* cited by examiner

*Primary Examiner* — Praachi M Pathak
(74) *Attorney, Agent, or Firm* — Banner & Witcoff, Ltd.

(57) ABSTRACT

There is provided a stapler including: a pair of clinchers that include a shaft portion, a staple abutting portion located closer to a distal end side than the shaft portion, and a spring abutting portion located closer to a proximal end side than the shaft portion, the pair of clinchers being rotatable about the shaft portion, and the staple abutting portion and the spring abutting portion being rotated in opposite directions from each other by rotation; a partition plate interposed between the pair of clinchers and partitioning one clincher and the other clincher from each other; and an elastic member having one end side fixed to the partition plate and the other end side abuttable against the spring abutting portion.

9 Claims, 9 Drawing Sheets

STAPLER

CROSS-REFERENCE TO RELATED APPLICATIONS

This application is based on and claims priority under 35 USC 119 from Japanese Patent Application No. 2022-207982 filed on Dec. 26, 2022, the contents of which are incorporated herein by reference.

TECHNICAL FIELD

The present disclosure relates to a stapler.

BACKGROUND ART

In the related art, there is known an electric stapler that automatically performs a binding process by driving a staple into a sheet bundle by a driver mechanism and folding leg portions of the staple penetrating the sheet bundle by a clincher portion. The electric stapler is mounted in, for example, an image forming apparatus that prints an image on a sheet or a post-processing apparatus that performs post-processing.

In recent years, miniaturization of an image forming apparatus and a post-processing apparatus has been required. Accordingly, it is required to reduce the size of the electric stapler mounted in the post-processing apparatus. In particular, a height dimension of the electric stapler is one of factors that determine a sheet transport path in the post-processing apparatus.

JPH11-512659A discloses a clincher structure including two anvil members that abut against leg portions of a staple and a drive member that is vertically displaced to rotate the anvil members.

However, in the clincher structure described in JPH11-512659A, since the anvil members are disposed above the drive member, a dimension in a height direction of the clincher increases. In such a case, if the transport path of the sheet passing through the outside of the clincher structure is adopted, the position (height direction) of the transport path of the sheet is determined according to the height dimension of the clincher, and therefore there is a problem that the image forming apparatus and the post-processing apparatus are increased in size.

SUMMARY OF INVENTION

The present disclosure provides a stapler capable of reducing a size of a clincher structure.

According to an illustrative aspect of the present disclosure, a stapler includes: a pair of clinchers that include a shaft portion, a staple abutting portion located closer to a distal end side than the shaft portion, and a spring abutting portion located closer to a proximal end side than the shaft portion, the pair of clinchers being rotatable about the shaft portion, and the staple abutting portion and the spring abutting portion being rotated in opposite directions from each other by rotation; a partition plate interposed between the pair of clinchers and partitioning one clincher and the other clincher from each other; and an elastic member having one end side fixed to the partition plate and the other end side abuttable against the spring abutting portion.

That is, the stapler includes a clincher in which the staple abutting portion, the shaft portion, and the spring abutting portion are arranged in this order.

According to the present disclosure, since the staple abutting portion is provided on the distal end side of the clincher and the spring abutting portion is provided on the proximal end side thereof, it is possible to reduce the size of the clincher portion.

DESCRIPTION OF EMBODIMENTS

Hereinafter, a preferred embodiment of the present disclosure will be described in detail with reference to the accompanying drawings.

Configuration Example of Electric Stapler 1

Figure 1:
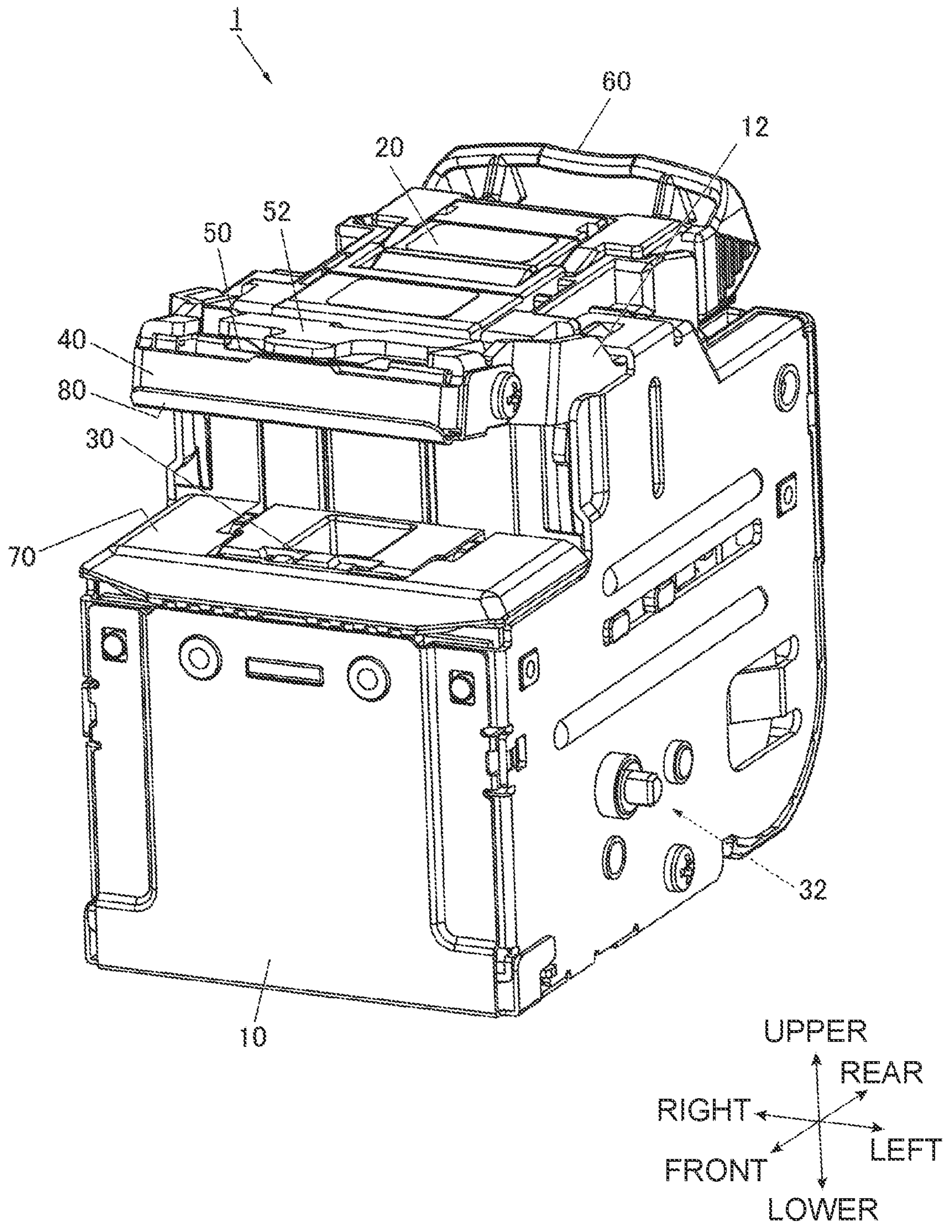
FIG. 1 is a front perspective view of an electric stapler according to the present embodiment.
Figure 2:
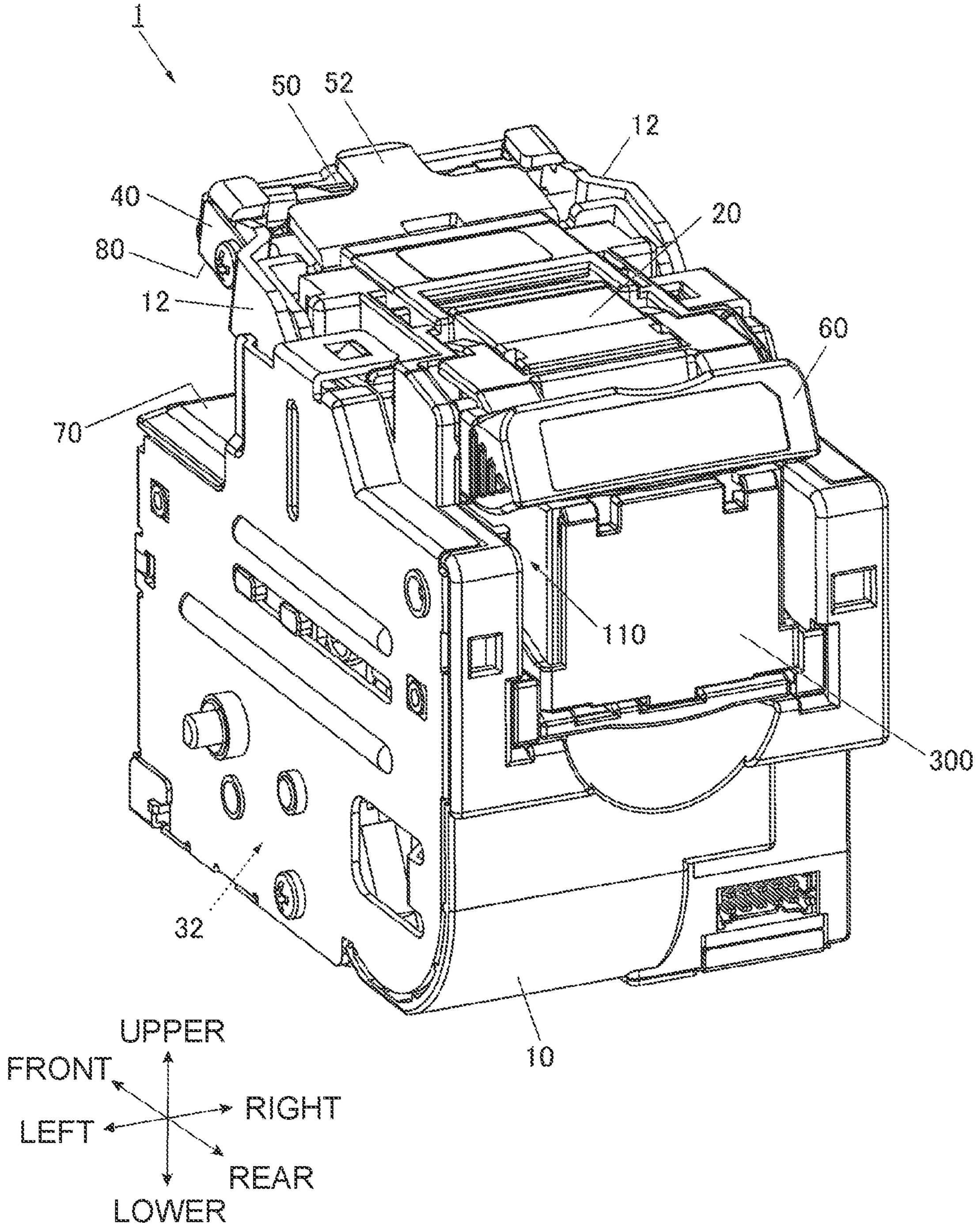
FIG. 2 is a rear perspective view of the electric stapler according to the present embodiment.

FIG. 1 is a front perspective view of an electric stapler 1 according to the present embodiment. FIG. 2 is a rear perspective view of the electric stapler 1 according to the present embodiment.

The electric stapler 1 according to the present embodiment is mounted, for example, in an image forming apparatus that forms a predetermined image on a sheet or in a post-processing apparatus connected to a downstream side of the image forming apparatus in a sheet transport direction. The electric stapler 1 performs a binding process on a sheet bundle including a plurality of sheets on which predetermined images are formed by the image forming apparatus using a staple. Specifically, the electric stapler 1 performs the binding process on the sheet bundle by sequentially performing a clamping step of clamping the sheet bundle, a penetrating step of penetrating a staple through the clamped sheet bundle, and a clinching step of folding leg portions of the staple penetrating the sheet bundle.

As shown in FIGS. 1 and 2, the electric stapler 1 includes a cartridge 20 in which a staple is accommodated, a stapler main body 10 to which the cartridge 20 is detachably attached, and a lever 60 which is provided to be displaceable with respect to the stapler main body 10. Further, the electric stapler 1 includes a driver mechanism 30 that drives a staple toward a sheet bundle, a table 40 that can move up and down with respect to the driver mechanism 30, and a clincher portion 50 that folds leg portions of the staple driven by the driver mechanism 30 and passing through the sheets.

In the present embodiment, a side on which the driver mechanism 30 is provided is a front side of the electric stapler 1, and a side on which the lever 60 is provided is a rear side of the electric stapler 1. A side on which the table 40 and the clincher portion 50 are provided is referred to as an upper side of the electric stapler 1, and an opposite side is referred to as a lower side.

A placement table 70 on which a sheet bundle is placed is provided at a position where the placement table 70 is above the driver mechanism 30 of the stapler main body 10 and faces the table 40. The driver mechanism 30 is disposed on the front side in the stapler main body 10, and is configured to be movable up and down with respect to the placement table 70 based on driving of a drive mechanism 32. The driver mechanism 30 forms a staple into a substantially U-shape by folding both ends of the staple by a forming plate (not shown), and drives the staple formed into the substantially U-shape toward the sheet bundle.

The table 40 is disposed to face upper sides of the driver mechanism 30 and the placement table 70. The table 40 is connected to the drive mechanism 32 via a frame 12, and is configured to be movable in an approaching direction and a separating direction with respect to the placement table 70 based on the driving of the drive mechanism 32. A surface (portion) of the table 40 facing the placement table 70 functions as a clamp portion 80 that clamps the sheet bundle between the surface and the placement table 70. The table 40 and the clamp portion 80 are configured to be movable between a clamping position where the sheet bundle is clamped and a home position where the sheet bundle is not clamped.

The clincher portion 50 is disposed at a front end portion of the table 40 at a position facing the driver mechanism 30. In cooperation with the driver mechanism 30, the clincher portion 50 presses the leg portions of the staple penetrating the sheet bundle and folds the legs portion of the staple inward, thereby binding the sheet bundle by the staple. A configuration of the clincher portion 50 will be described later.

The cartridge 20 is detachably attached to a mounting portion 110 provided at a rear portion of the stapler main body 10. A refill 300 on which sheet-type connected staples are stacked is accommodated in the cartridge 20. The connected staples in the refill 300 are transported to a forming position by a feed mechanism (not shown) of the driver mechanism 30.

Configuration Example of Clincher Portion 50

Next, the configuration and the like of the clincher portion 50 will be described in detail.

Figure 3A:
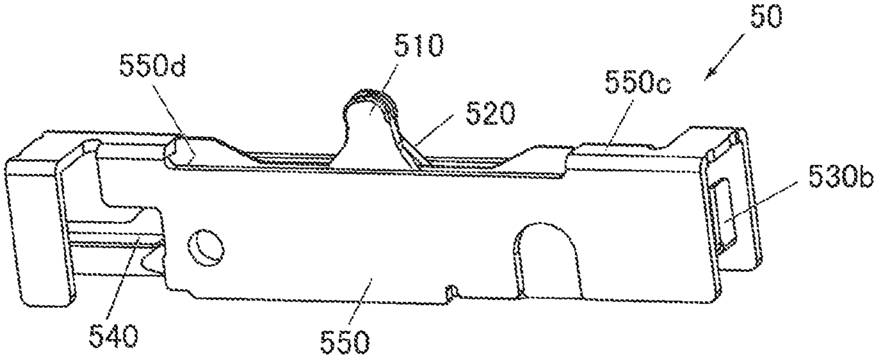
FIG. 3A is a perspective view showing a clincher portion according to the present embodiment.
Figure 3B:
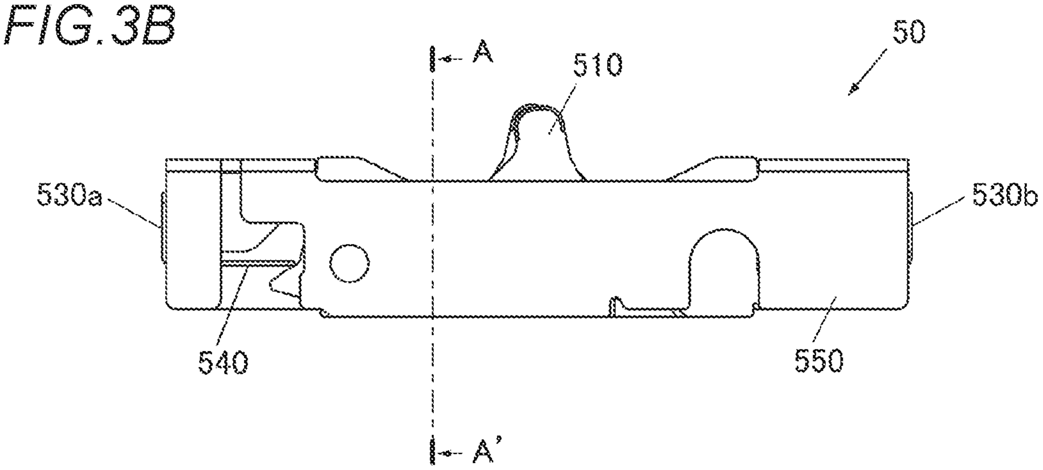
FIG. 3B is a plan view of the clincher portion according to the present embodiment.
Figure 3C:
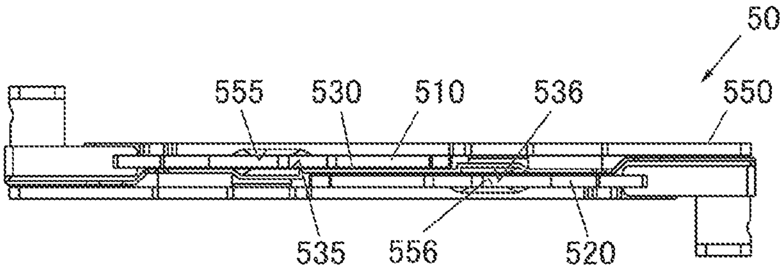
FIG. 3C is a bottom view of the clincher portion according to the present embodiment.
Figure 4A:
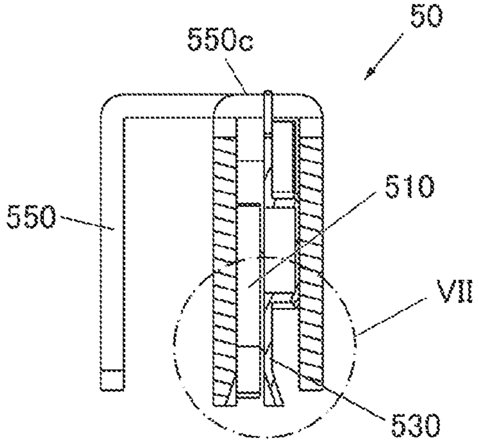
FIG. 4A is a cross-sectional view taken along a line A-A' of the clincher portion shown in FIG. 3B according to the present embodiment.
Figure 4B:
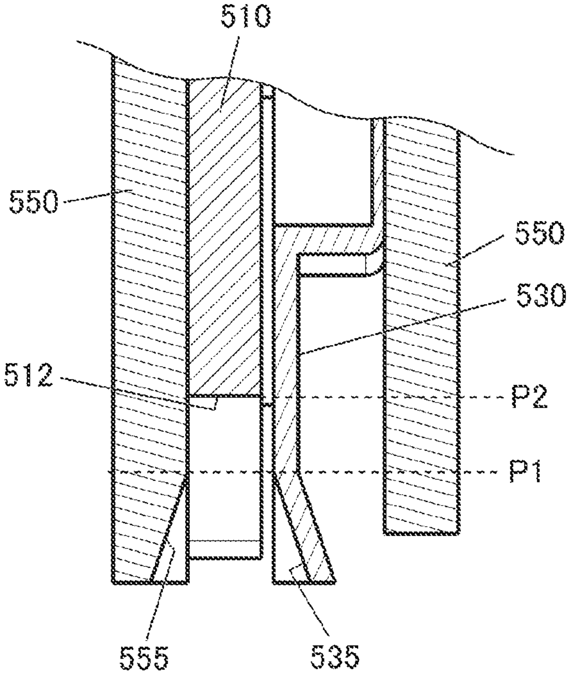
FIG. 4B is a cross-sectional view of a main part of the clincher portion shown in FIG. 4A according to the present embodiment.
Figure 5A:
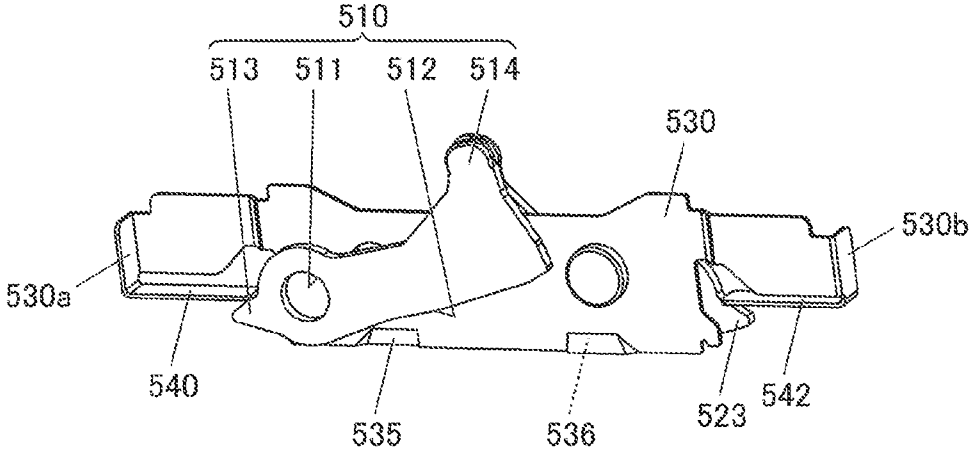
FIG. 5A is a front perspective view of the clincher portion according to the present embodiment with a case removed.
Figure 5B:
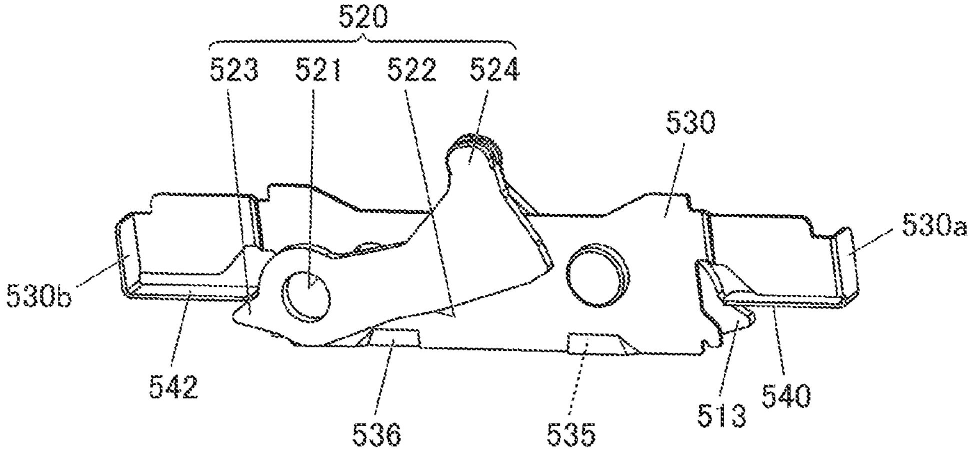
FIG. 5B is a rear perspective view of the clincher portion according to the present embodiment with the case removed.
Figure 6:
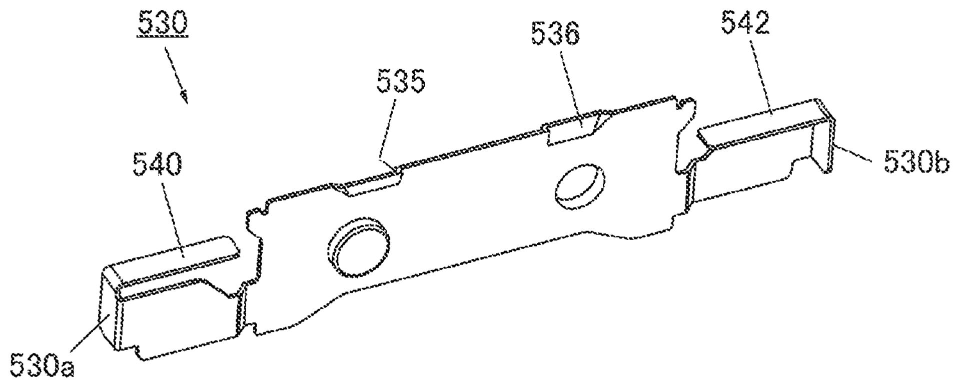
FIG. 6 is a perspective view showing a partition plate of the clincher portion according to the present embodiment.
Figure 7:
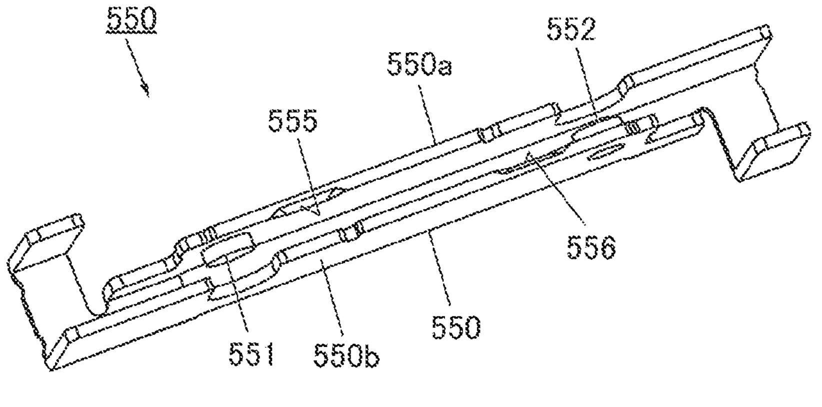
FIG. 7 is a perspective view showing the case of the clincher portion according to the present embodiment.

FIG. 3A is a perspective view showing the clincher portion 50 according to the present embodiment, FIG. 3B is a plan view of the clincher portion 50, and FIG. 3C is a bottom view of the clincher portion 50. FIG. 4A is a cross-sectional view taken along a line A-A' of the clincher portion 50 shown in FIG. 3B, and FIG. 4B is a cross-sectional view of a main part of FIG. 4A. FIG. 5A is a front perspective view of the clincher portion 50 with a case 550 removed, and FIG. 5B is a rear perspective view of the clincher portion 50 with the case 550 removed. FIG. 6 is a perspective view showing a partition plate 530 of the clincher portion 50. FIG. 7 is a perspective view showing the case 550 of the clincher portion 50.

As shown in FIGS. 3A, 5A and the like, the clincher portion 50 includes a pair of a first clincher 510 and a second clincher 520, the partition plate 530 that partitions the first clincher 510 and the second clincher 520, a first plate spring 540 that can urge the first clincher 510, a second plate spring 542 that can urge the second clincher 520, and the case 550 that accommodates these members.

The first clincher 510 has an elongated flat plate shape and is disposed so as to overlap a front surface of the partition plate 530 in a plan view. The first clincher 510 includes a shaft portion 511 provided on a proximal end side of the first clincher 510, a staple abutting portion 512 located on a distal end side of the shaft portion 511, a spring abutting portion 513 located on the proximal end side of the shaft portion 511, and a pressed portion 514 protruding upward from the distal end portion of the first clincher 510.

As shown in FIG. 5A, the shaft portion 511 has a shaft hole penetrating the first clincher 510 in a thickness direction. A first support shaft 551 formed on an inner surface of a front wall 550*a* of the case 550 is engaged with the shaft portion 511. Accordingly, the first clincher 510 is supported to be rotatable about the first support shaft 551, and when the first clincher 510 rotates about the shaft portion 511, the staple abutting portion 512 and the spring abutting portion 513 rotate in opposite directions.

The staple abutting portion 512 is configured by a part of a lower surface of the first clincher 510, and receives and folds one leg portion of the staple penetrating the sheet bundle. The staple abutting portion 512 moves to an open position where the staple abutting portion 512 is inclined obliquely upward in the clamping step and the penetrating step, and moves to a closed position in a substantially horizontal direction along a longitudinal direction of the partition plate 530 at the home position in the clinching step.

The spring abutting portion 513 protrudes outward from a base end portion of the first clincher 510. The spring abutting portion 513 can abut against a lower surface of the first plate spring 540, is urged downward by abutting against the first plate spring 540 in the clamping step, and moves the staple abutting portion 512 side on the opposite side upward. In addition, the spring abutting portion 513 also functions as a stopper that regulates the rotation of the first clincher 510 by abutting against a back surface of the clamp portion 80 when the staple abutting portion 512 of the first clincher 510 is pushed up by the leg portion of the staple and the first clincher 510 rotates. In the present embodiment, an upper surface of the spring abutting portion 513 abuts against the lower surface of the first plate spring 540, and a lower surface of the spring abutting portion 513 abuts against the back surface of the clamp portion 80.

The second clincher 520 has an elongated flat plate shape and is disposed symmetrically with respect to a distal end side of the first clincher 510 and is disposed so as to overlap a rear surface of the partition plate 530 in a plan view. The second clincher 520 includes a shaft portion 521 provided on a proximal end side of the second clincher 520, a staple abutting portion 522 located on a distal end side of the shaft portion 521, a spring abutting portion 523 located on the proximal end side of the shaft portion 521, and a pressed portion 524 protruding upward from the distal end portion of the second clincher 520.

As shown in FIG. 5B, the shaft portion 521 has a shaft hole penetrating the second clincher 520 in a thickness direction. A second support shaft 552 formed on an inner surface of a rear wall 550*b* of the case 550 is engaged with the shaft portion 521. Accordingly, the second clincher 520 is configured to be rotatable about the second support shaft 552. When the second clincher 520 rotates about the shaft portion 521, the staple abutting portion 522 and the spring abutting portion 523 rotate in opposite directions.

The staple abutting portion 522 is configured by a part of a lower surface of the second clincher 520, and receives and folds the other leg portion of the staple penetrating the sheet bundle. The staple abutting portion 522 moves to an open position where the staple abutting portion 522 is inclined obliquely upward in the clamping step and the penetrating step, and moves to a closed position in a substantially horizontal direction along a longitudinal direction of the partition plate 530 at the home position in the clinching step.

The spring abutting portion 523 protrudes outward from a base end portion of the second clincher 520. The spring abutting portion 523 can abut against a lower surface of the second plate spring 542, is urged downward by abutting against the second plate spring 542 in the clamping step, and moves the staple abutting portion 522 side on the opposite side upward. In addition, the spring abutting portion 523 also functions as a stopper that regulates the rotation of the second clincher 520 by abutting against a back surface of the clamp portion 80 when the staple abutting portion 522 of the second clincher 520 is pushed up by the leg portion of the staple and the second clincher 520 rotates. In the present embodiment, an upper surface of the spring abutting portion 523 abuts against the lower surface of the second plate spring 542, and a lower surface of the spring abutting portion 523 abuts against the back surface of the clamp portion 80.

As shown in FIGS. 3A and 6, the partition plate 530 is an elongated flat plate longer than the first clincher 510 and the like, and is interposed between the first clincher 510 and the second clincher 520. The partition plate 530 includes a first pickup portion 535 that guides the one leg portion of the staple penetrating the sheet bundle to the first clincher 510, and a second pickup portion 536 that guides the other leg portion of the staple penetrating the sheet bundle to the second clincher 520.

The first pickup portion 535 is a surface of the partition plate 530 facing the first clincher 510, and has an inclined surface that is inclined in a direction gradually approaching the first clincher 510 from a lower end thereof toward an upper side. The first pickup portion 535 is located above the one leg portion penetrating the sheet bundle, and guides the one leg portion of the staple penetrating the sheet bundle rising from a lower side to the staple abutting portion 512 of the first clincher 510 by receiving and sliding the one leg portion from the inclined surface. In the clamping step, as shown in FIGS. 4A and 4B, a position P1 of an upper end of the inclined surface of the first pickup portion 535 is lower than (in front of) a position P2 of the staple abutting portion 512 of the first clincher 510, which is inclined by urging of the first plate spring 540. This is because, when the first pickup portion 535 is located below the staple abutting portion 512 of the first clincher 510, if there is a gap between the first clincher 510 and the partition plate 530, the one leg portion of the staple penetrating the sheet bundle may be inserted into the gap and may not be pulled out, and a binding failure may occur. In the present embodiment, since the staple is driven into upward, the position P1 of the upper end of the inclined surface of the first pickup portion 535 is lower than the position P2 of the staple abutting portion 512, but the position P1 is not limited to being lower than the position P2 as long as the position P1 is on a front side in a driving-into direction of the stapler.

As shown in FIGS. 4A and 4B, the second pickup portion 536 is a surface of the partition plate 530 facing the second clincher 520, and has an inclined surface that is inclined in a direction gradually approaching the second clincher 520 from a lower end thereof toward an upper side. The second pickup portion 536 is located above the other leg portion penetrating the sheet bundle, and guides the other leg portion of the staple penetrating the sheet bundle rising from the lower side to the staple abutting portion 522 of the second clincher 520 by receiving and sliding the other leg portion from the inclined surface. In the clamping step, a position P1 of an upper end of the inclined surface of the second pickup portion 536 is lower than (in front of) a position P2 of the staple abutting portion 522 of the second clincher 520, which is inclined by urging of the second plate spring 542, as in the first pickup portion 535. In the present embodiment, since the staple is driven into upward, the position P1 of the upper end of the inclined surface of the second pickup portion 536 is lower than the position P2 of the staple abutting portion 522, but the position P1 is not limited to being lower than the position P2 as long as the position P1 is on the front side in the driving-into direction of the stapler.

As shown in FIGS. 5A and 6, one end side of the first plate spring 540 is fixed to a side wall 530*a* on one end side of the partition plate 530, and the other end side of the first plate spring 540 extends to a position where the first plate spring 540 can abut against the spring abutting portion 513 of the first clincher 510. In the present embodiment, the first plate spring 540 is integrally formed with the partition plate 530 by inward folding a lower end portion of the side wall 530*a* on one end side of the partition plate 530. The first plate spring 540 may be configured by a separate component from the partition plate 530. The first plate spring 540 is elastically deformable, and urges the spring abutting portion 513 downward when the spring abutting portion 513 of the first clincher 510 abuts against the first plate spring 540. The first plate spring 540 is an example of an elastic member.

As shown in FIGS. 5B, 6 and the like, one end side of the second plate spring 542 is fixed to a side wall 530*b* on the other side of the partition plate 530, and the other end side of the second plate spring 542 extends to a position where the second plate spring 542 can abut against the spring abutting portion 523 of the second clincher 520. In the present embodiment, the second plate spring 542 is integrally formed with the partition plate 530 by inward folding a lower end portion of the side wall 530*b* on the other end side of the partition plate 530. The second plate spring 542 may be configured by a separate component from the partition plate 530. The second plate spring 542 is elastically deformable, and urges the spring abutting portion 523 downward when the spring abutting portion 523 of the second clincher 520 abuts against the second plate spring 542. The second plate spring 542 is an example of the elastic member.

As shown in FIGS. 3A, 4A, and 7, the case 550 has a substantially inverted U-shape in a side view, and covers the first clincher 510, the second clincher 520, and the partition plate 530. As shown in FIG. 7, the first support shaft 551 that rotatably supports the first clincher 510 is formed on an inner surface (a surface facing the partition plate 530) of the front wall 550*a* of the case 550. The first support shaft 551 protrudes from the inner surface of the front wall 550*a* and is engageable with the shaft portion 511 from the front side of the first clincher 510.

As shown in FIG. 7, the second support shaft 552 that rotatably supports the second clincher 520 is formed on an inner surface (a surface facing the partition plate 530) of the rear wall 550*b* of the case 550. The second support shaft 552 protrudes from the inner surface of the rear wall 550*b* and is engageable with the shaft portion 521 from the rear side of the second clincher 520.

An opening portion 550*d* is formed in an upper wall 550*c* of the case 550. The first clincher 510 and the second clincher 520 are disposed below the opening portion 550*d*. Accordingly, the pressed portion 514 of the first clincher 510 and the pressed portion 524 of the second clincher 520 can protrude from the opening portion 550*d* in accordance with the rotation of the first clincher 510 and the second clincher 520.

As shown in FIGS. 4B and 7, a third pickup portion 555 is formed on the inner surface of the front wall 550*a* of the case 550 at a position where the third pickup portion 555 faces the first pickup portion 535 of the partition plate 530. The third pickup portion 555 has an inclined surface inclined in a direction gradually approaching the first clincher 510 from the lower end of the case 550 toward the upper side. The third pickup portion 555 receives a distal end of the one leg portion penetrating the sheet bundle rising from the lower side, and guides the one leg portion of the staple to the staple abutting portion 512 of the first clincher 510 by sliding the one leg portion along the inclined surface. A position of an upper end of the inclined surface of the third pickup portion 555 is lower than the position of the staple abutting portion 512 of the first clincher 510 in the clamping step.

As shown in FIG. 7, a fourth pickup portion 556 is formed on the inner surface of the rear wall 550*b* of the case 550 at a position where the fourth pickup portion 556 faces the second pickup portion 536 of the partition plate 530. The fourth pickup portion 556 has an inclined surface inclined in a direction gradually approaching the second clincher 520 from the lower end of the case 550 toward the upper side. The fourth pickup portion 556 receives a distal of the other leg portion penetrating the sheet bundle rising from the lower side, and guides the other leg portion of the staple to the staple abutting portion 522 of the second clincher 520 by sliding the other leg portion along the inclined surface. Similarly to the third pickup portion 555, a position of an upper end of the inclined surface of the fourth pickup portion 556 is lower than the position of the staple abutting portion 522 of the second clincher 520 in the clamping step.

According to the present embodiment, on the first clincher 510 side, the first plate spring 540, the spring abutting portion 513, the shaft portion 511, the staple abutting portion 512, and the pressed portion 514 are arranged side by side in this order along a longitudinal direction of the first clincher 510 (the partition plate 530). Further, the first plate spring 540, the spring abutting portion 513, the shaft portion 511, and the staple abutting portion 512 are arranged in a substantially line along the longitudinal direction of the partition plate 530. Accordingly, when the table 40 is located at the home position, the first plate spring 540, the spring abutting portion 513, the shaft portion 511, the staple abutting portion 512, and the pressed portion 514 can be disposed so as to fall within a range of a height dimension of the partition plate 530, and can be configured to hardly protrude from the upper wall 550*c* of the case 550. Similarly, on the second clincher 520 side, the second plate spring 542, the spring abutting portion 523, the shaft portion 521, the staple abutting portion 522, and the pressed portion 524 are arranged side by side in this order along a longitudinal direction of the second clincher 520 (the partition plate 530). With this configuration, the second plate spring 542, the spring abutting portion 523, the shaft portion 521, the staple abutting portion 522, and the pressed portion 524 do not substantially protrude from the upper wall 550*c* of the case 550 on the second clincher 520 side.

Operation Example of Electric Stapler 1

Figure 8A:
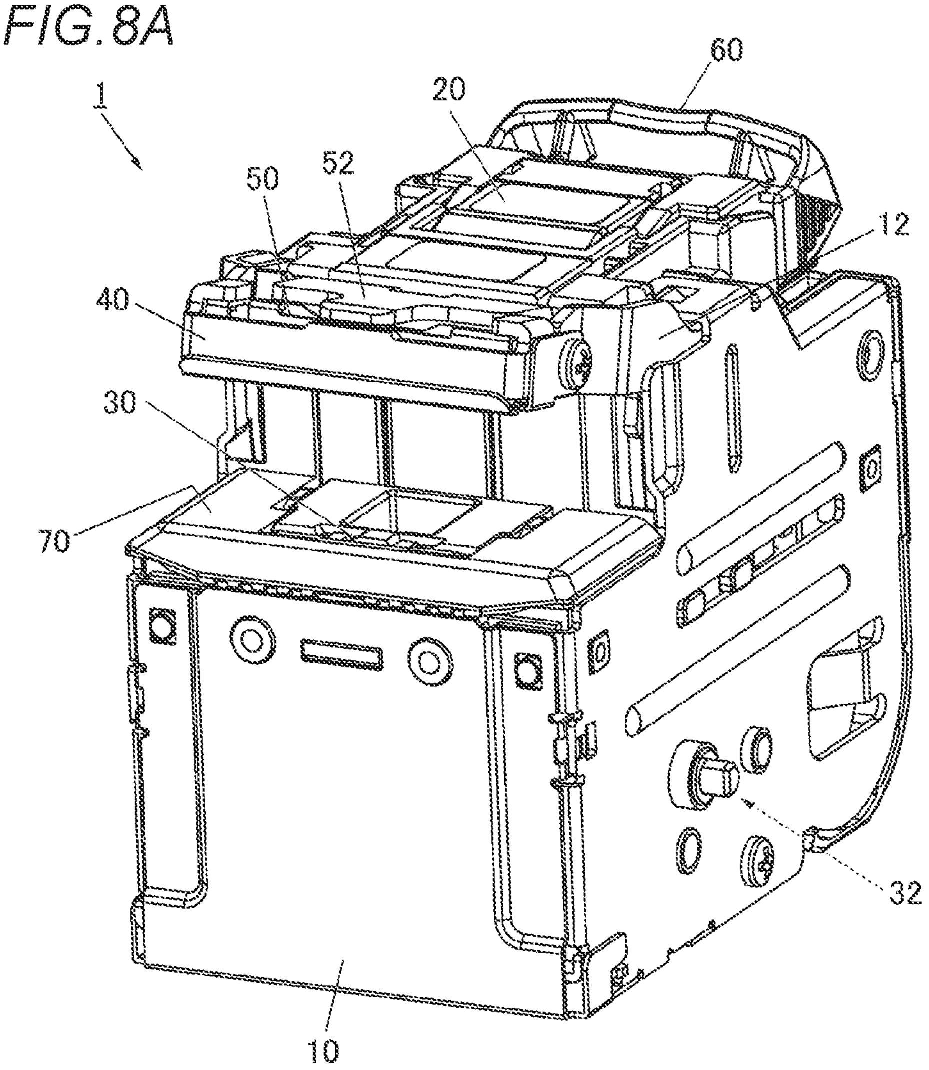
FIG. 8A is a diagram showing an example of an operation of the electric stapler according to the present embodiment when a table is at a home position.
Figure 8B:
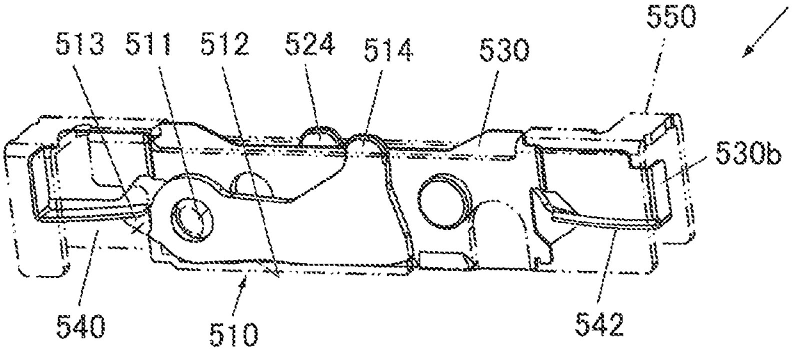
FIG. 8B is a diagram showing an example of an operation of the clincher portion according to the present embodiment when the table is at the home position.
Figure 9A:
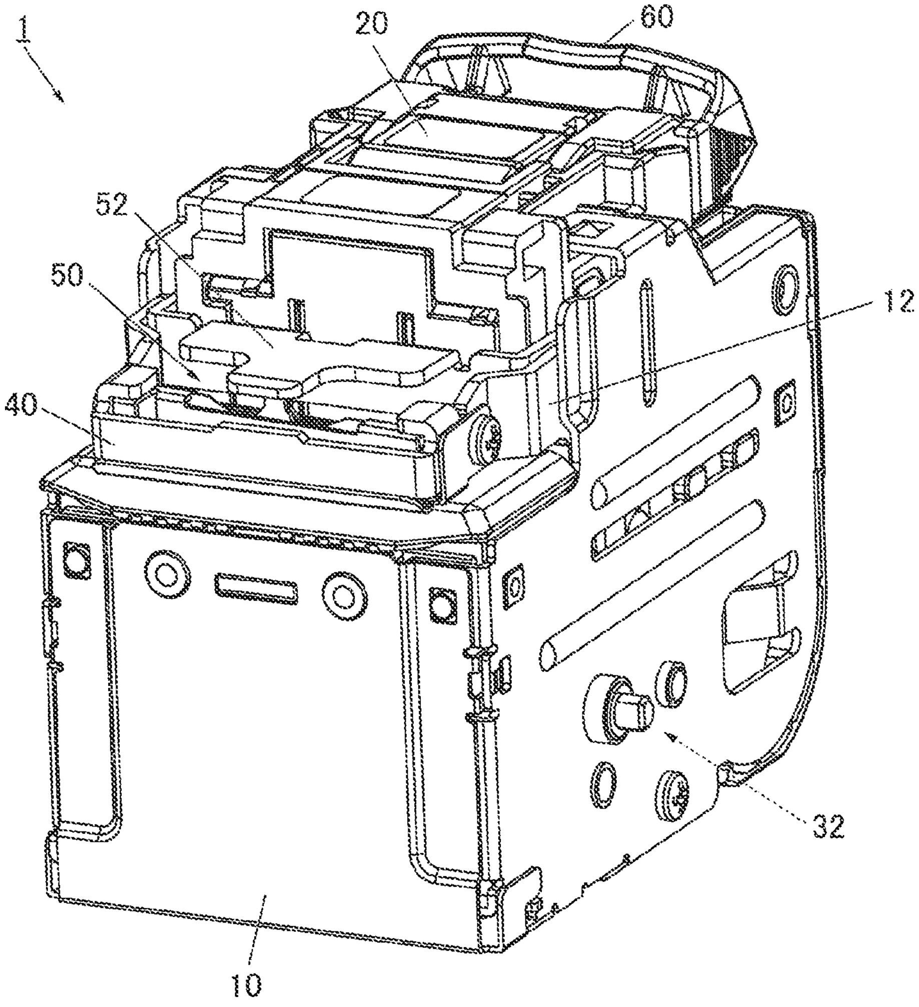
FIG. 9A is a diagram showing an example of an operation of the electric stapler according to the present embodiment when a clamping step is performed.
Figure 9B:
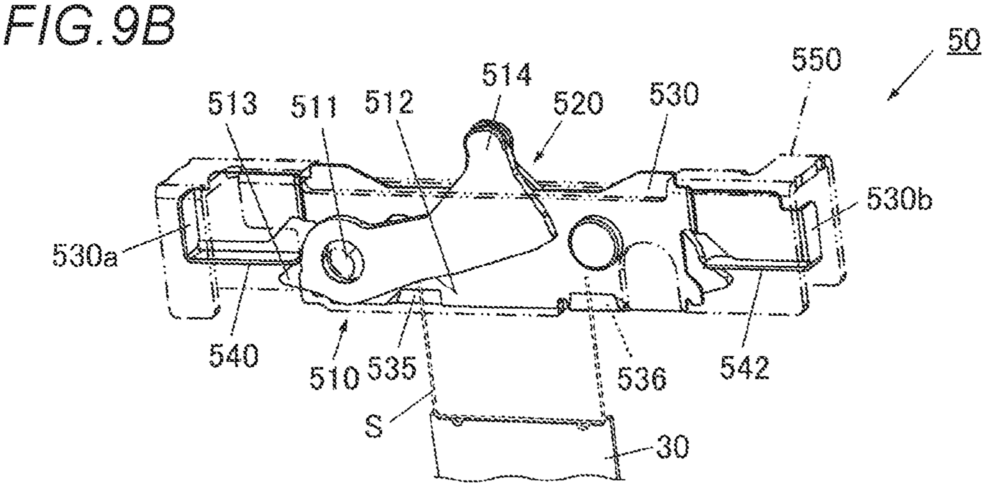
FIG. 9B is a diagram showing an example of an operation of the clincher portion according to the present embodiment when the clamping step is performed.
Figure 10A:
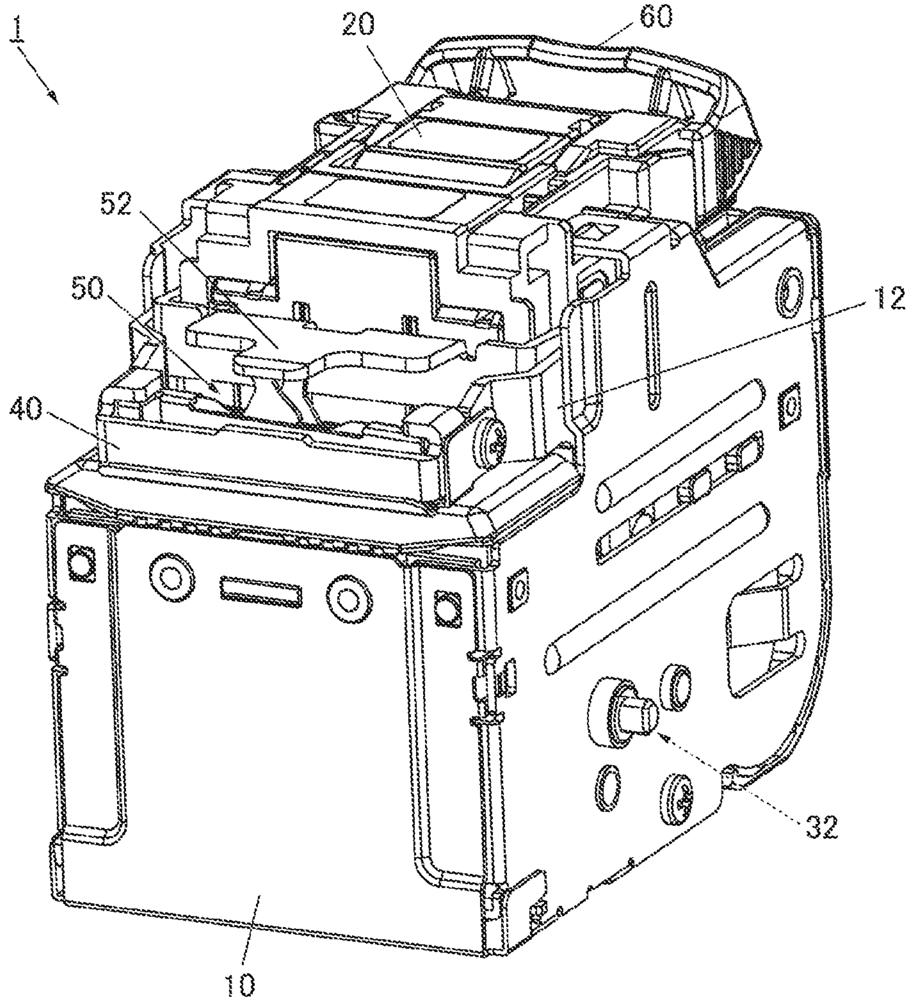
FIG. 10A is a diagram showing an example of an operation of the electric stapler according to the present embodiment when a penetrating step is performed.
Figure 10B:
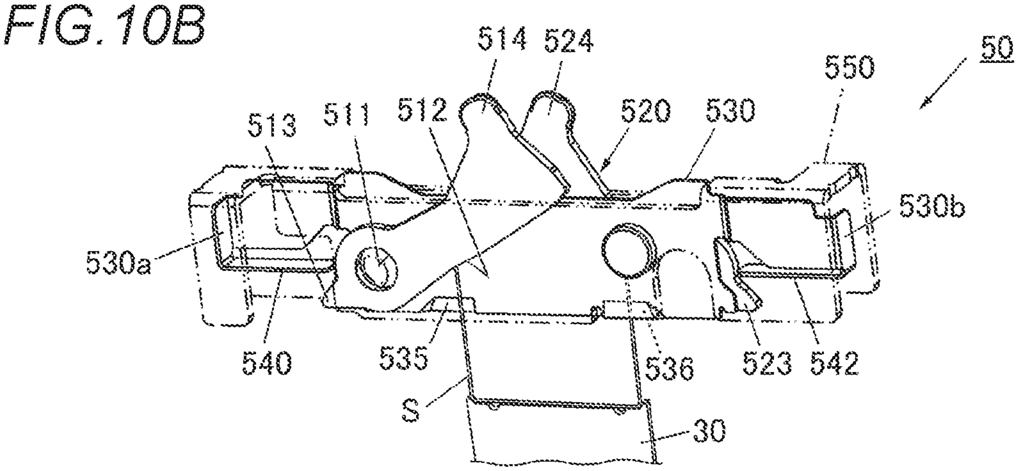
FIG. 10B is a diagram showing an example of an operation of the clincher portion according to the present embodiment when the penetrating step is performed.

Next, an example of an operation during the binding process of the electric stapler 1 according to the present embodiment will be described. FIG. 8A is a diagram showing an example of an operation of the electric stapler 1 when the table 40 according to the present embodiment is at the home position, and FIG. 8B is a diagram showing an example of an operation of the clincher portion 50 when the table 40 is at the home position. FIG. 9A is a diagram showing an example of an operation of the electric stapler 1 when the clamping step is performed, and FIG. 9B is a diagram showing an example of an operation of the clincher portion 50 when the clamping step is performed. FIG. 10A is a diagram showing an example of an operation of the electric stapler 1 when the penetrating step is performed, and FIG. 10B is a diagram showing an example of an operation of the clincher portion 50 when the penetrating step is performed.

As shown in FIGS. 8A and 8B, when the table 40 is at the home position, the pressed portion 514 of the first clincher 510 and the pressed portion 524 of the second clincher 520 are pressed downward by a clincher link 52. Therefore, the spring abutting portion 513 on an opposite side to the pressed portion 514 in the first clincher 510 moves upward. Accordingly, the first plate spring 540 abutting on the upper surface of the spring abutting portion 513 is elastically deformed and bent by being pushed up by the spring abutting portion 513.

Similarly, the spring abutting portion 523 on an opposite side to the pressed portion 524 in the second clincher 520 moves upward. Accordingly, the second plate spring 542 abutting on the upper surface of the spring abutting portion 523 is elastically deformed and bent by being pushed up by the spring abutting portion 523.

Next, the clamping step is performed. When a plurality of sheets are placed on the placement table 70, the table 40 is lowered via the frame 12 by driving of the drive mechanism 32. Accordingly, as shown in FIGS. 9A and 9B, the sheet bundle placed on the placement table 70 is clamped by the clamp portion 80. When the table 40 is lowered to the clamping position, the pressing by the clincher link 52 is released (no load is applied), and accordingly, as shown in FIG. 9B, the first plate spring 540 is restored by an amount of deflection to push down the spring abutting portion 513 of the first clincher 510. Accordingly, the first clincher 510 rotates counterclockwise about the shaft portion 511 to move the pressed portion 514 upward.

Similarly, when the pressing by the clincher link 52 is released, the second plate spring 542 is restored by the amount of deflection to push down the spring abutting portion 523 of the second clincher 520. Accordingly, the second clincher 520 rotates clockwise about the shaft portion 521 to move the pressed portion 524 upward. The first clincher 510 and the second clincher 520 are inclined obliquely upward toward a central portion of the partition plate 530 and take a posture of opening each other. At this time, the staple abutting portion 512 of the first clincher 510 is located above the first pickup portion 535 and the like, and the staple abutting portion 522 of the second clincher 520 is located above the second pickup portion 536 and the like. In this way, a state in which front ends of the leg portions of the staple are received is completed.

Next, the penetrating step is performed. When the driver mechanism 30 is raised by the driving of the drive mechanism 32, both ends of the staple are folded by a forming plate (not shown) to form the staple into a substantially U-shape, and the staple formed into a substantially U-shape is driven toward the sheet bundle. Accordingly, the staple is raised toward the placement table 70 together with the driver mechanism 30, and the leg portion of the staple penetrates the sheet bundle on the placement table 70.

As indicated by a broken line in FIG. 9B, the one leg portion of the staple S penetrating the sheet bundle abuts against the first pickup portion 535 of the partition plate 530 or the third pickup portion 555 of the case 550 and slides on the inclined surface thereof to be guided to the staple abutting portion 512 side. As shown in FIGS. 10A and 10B, the leg portion of the staple S guided toward the staple abutting portion 512 collides with the staple abutting portion 512 to push up the staple abutting portion 512, and the first clincher 510 is rotated counterclockwise about the shaft portion 511.

Similarly, as indicated by the broken line in FIG. 9B, the other leg portion of the staple S penetrating the sheet bundle abuts against the second pickup portion 536 of the partition plate 530 or the fourth pickup portion 556 of the case 550 and slides on the inclined surface 525*a* thereof to be guided to the staple abutting portion 522 side. As shown in FIGS. 10A and 10B, the leg portion of the staple guided toward the staple abutting portion 522 collides with the staple abutting portion 522 to push up the staple abutting portion 522, and the second clincher 520 is rotated clockwise about the shaft portion 521. At this time, the clincher link 52 is simultaneously pushed up by the pressed portion 514 of the rotating first clincher 510 and the pressed portion 524 of the rotating second clincher 520.

When the first clincher 510 is pushed up, as shown in FIG. 10B, the first clincher 510 rotates counterclockwise, so that the spring abutting portion 513 separates from the first plate spring 540. Accordingly, the first plate spring 540 is in a free state where no load is applied. When the first clincher 510 further rotates with respect to the one leg portion of the staple moving upward, the spring abutting portion 513 abuts against the back surface of the clamp portion 80, thereby regulating (stopping) the rotation of the first clincher 510. In the present embodiment, an upper surface of the spring abutting portion 513 abuts against the lower surface of the first plate spring 540, and a lower surface of the spring abutting portion 513 abuts against the back surface of the clamp portion 80.

Similarly, when the second clincher 520 is pushed up, as shown in FIG. 10B, the second clincher 520 rotates clockwise, so that the spring abutting portion 523 separates from the second plate spring 542. Accordingly, the second plate spring 542 is in a free state where no load is applied. At this time, when the second clincher 520 is further rotated by the other leg portion of the staple moving upward, the spring abutting portion 523 abuts against the back surface of the clamp portion 80, thereby regulating the rotation of the second clincher 520. In the present embodiment, an upper surface of the spring abutting portion 523 abuts against the lower surface of the second plate spring 542, and a lower surface of the spring abutting portion 523 abuts against the back surface of the clamp portion 80.

Subsequently, the clinching step is performed. When the driver mechanism 30 further moves upward, the staple also moves upward. Accordingly, since the upward rotation of the first clincher 510 is regulated, the one leg portion of the staple is gently curved along the inclined staple abutting portion 512 of the first clincher 510. Similarly, since the upward rotation of the second clincher 520 is also regulated, the other leg portion of the staple is gently curved along the inclined staple abutting portion 522 of the second clincher 520.

Next, the clincher link 52 presses the pressed portion 514 of the first clincher 510 and the pressed portion 524 of the second clincher 520 by a cam (not shown). Accordingly, the first clincher 510 rotates clockwise about the shaft portion 511, and the staple abutting portion 512 of the first clincher 510 moves downward, so that the one curved leg portion of the staple is pressed and folded inward.

Similarly, the second clincher 520 rotates counterclockwise about the shaft portion 521, and the staple abutting portion 522 of the second clincher 520 moves downward, so that the other leg portion of the staple is pressed and folded inward. In this way, both leg portions of the staple are folded inward, and the sheet bundle is bound by the staple.

At this time, the spring abutting portion 513 of the first clincher 510 moves upward, and the first plate spring 540 is pushed up against an elastic force to be elastically deformed and bent. Similarly, the spring abutting portion 523 of the second clincher 520 moves upward, and the second plate spring 542 is pushed up against an elastic force to be elastically deformed and bent.

Next, a return step is performed. In the return step, the table 40 is raised and returned to the home position via a frame (not shown) by the driving of the drive mechanism 32, and the driver mechanism 30 is lowered and returned to the home position (see 8A). Accordingly, a space between the table 40 and the placement table 70 is opened, and preparation for binding the next sheet bundle is completed.

As described above, according to the present embodiment, since the first plate spring 540 is fixed to the partition plate 530, and the first plate spring 540, the spring abutting portion 513 of the first clincher 510, the shaft portion 511, and the staple abutting portion 512 are arranged side by side along the longitudinal direction of the partition plate 530, when the table 40 is located at the home position, the first plate spring 540, the spring abutting portion 513, the shaft portion 511, the staple abutting portion 512, and the pressed portion 514 can be disposed so as to fall within the range of the height dimension of the partition plate 530, and can be configured to be substantially flush with the upper wall 550*c* of the case 550. Similarly, on the second clincher 520 side, the second plate spring 542, the spring abutting portion 523, the shaft portion 521, the staple abutting portion 522, and the pressed portion 524 can be disposed so as to fall within the range of the height dimension of the partition plate 530, and can be configured to hardly protrude from the upper wall 550*c* of the case 550. Accordingly, the height dimension of the clincher portion 50 can be reduced, and the clincher portion 50 can be downsized. As a result, for example, in the image forming apparatus or the post-processing apparatus, the sheet transport path can be set at a low position, and thus the entire apparatus can be downsized.

According to the present embodiment, since in the clamping step, the position P1 of the upper end of the inclined surface of the first pickup portion 535 and the position P1 of the upper end of the inclined surface of the third pickup portion 555 are lower than the position P2 of the staple abutting portion 512 of the first clincher 510, the leg portions of the staple penetrating the sheet bundle can be reliably guided to the staple abutting portion 512 of the first clincher 510. As a result, it is possible to prevent the occurrence of a binding failure such that the staple enters a gap between the first clincher 510 and the partition plate 530 or the case 550 and the binding process cannot be performed. The same effect can be achieved for the second pickup portion 536 and the fourth pickup portion 556.

Although a preferred embodiment of the present disclosure has been described in detail above with reference to the accompanying drawings, the technical scope of the present disclosure is not limited thereto. It is apparent that a person having ordinary knowledge in the technical field of the present disclosure can conceive various changes or modifications within the scope of the technical idea described in the claims, and it is understood that the changes or modifications naturally belong to the technical scope of the present disclosure.

For example, in the embodiment described above, an example in which the first plate spring 540 and the second plate spring 542 are used as the elastic members that urge the first clincher 510 and the second clincher 520 to the positions where the leg portions of the staple are received has been described, but the present disclosure is not limited thereto. For example, torsion coil springs may be attached to the shaft portions 511 and 521 to adjust the positions of the first clincher 510 and the second clincher 520.

What is claimed is:

1. A stapler comprising:

a pair of clinchers that include a shaft portion, a staple abutting portion located closer to a distal end side than the shaft portion, and a spring abutting portion located closer to a proximal end side than the shaft portion, the pair of clinchers being rotatable about the shaft portion, and the staple abutting portion and the spring abutting portion being rotated in opposite directions from each other by rotation;

a partition plate interposed between the pair of clinchers and partitioning one clincher and the other clincher from each other; and an elastic member having one end side fixed to the partition plate and the other end side abuttable against the spring abutting portion, wherein the elastic member is a plate spring, and abuts against the spring abutting portion when the clincher rotates about the shaft portion by a predetermined angle or more.

2. The stapler according to claim 1, wherein the elastic member, the spring abutting portion, the shaft portion, and the staple abutting portion are arranged along a longitudinal direction of the partition plate in series.

3. The stapler according to claim 2, wherein the partition plate includes a pickup portion that guides a leg portion of the staple to the staple abutting portion, and the pickup portion is located in front of the staple abutting portion when the the pair of clinchers are at the position rotated by the predetermined angle.

4. The stapler according to claim 3, wherein the plate spring is formed integrally with the partition plate.

5. The stapler according to claim 2, further comprising:

a case surrounding an outer side of the pair of clinchers, wherein the case includes a pickup portion that guides a leg portion of the staple to the staple abutting portion, and the pickup portion is located in front of the staple abutting portion of the pair of clinchers when the pair of clinchers are at the position rotated by the predetermined angle.

6. The stapler according to claim 1, wherein the spring abutting portion overlaps with a part of the elastic member in an upper-lower direction, and is located side by side with the elastic member.

7. The stapler according to claim 1, wherein the elastic member is fixed with side surfaces of both side of the partition plate in a longitudinal direction of the partition plate.

8. The stapler according to claim 1, wherein the side surfaces of the partition plate are erected in a direction in which the partition plate are overlapped between the pair of clinchers.

9. The stapler according to claim 8, wherein the spring abutting portion has a shape that protrudes towards the side surfaces of the partition plate.

* * * * *